Sept. 13, 1938.　　　　　G. PICKEL　　　　　2,130,312
CORN SHREDDING MECHANISM
Filed July 1, 1936　　　2 Sheets-Sheet 1
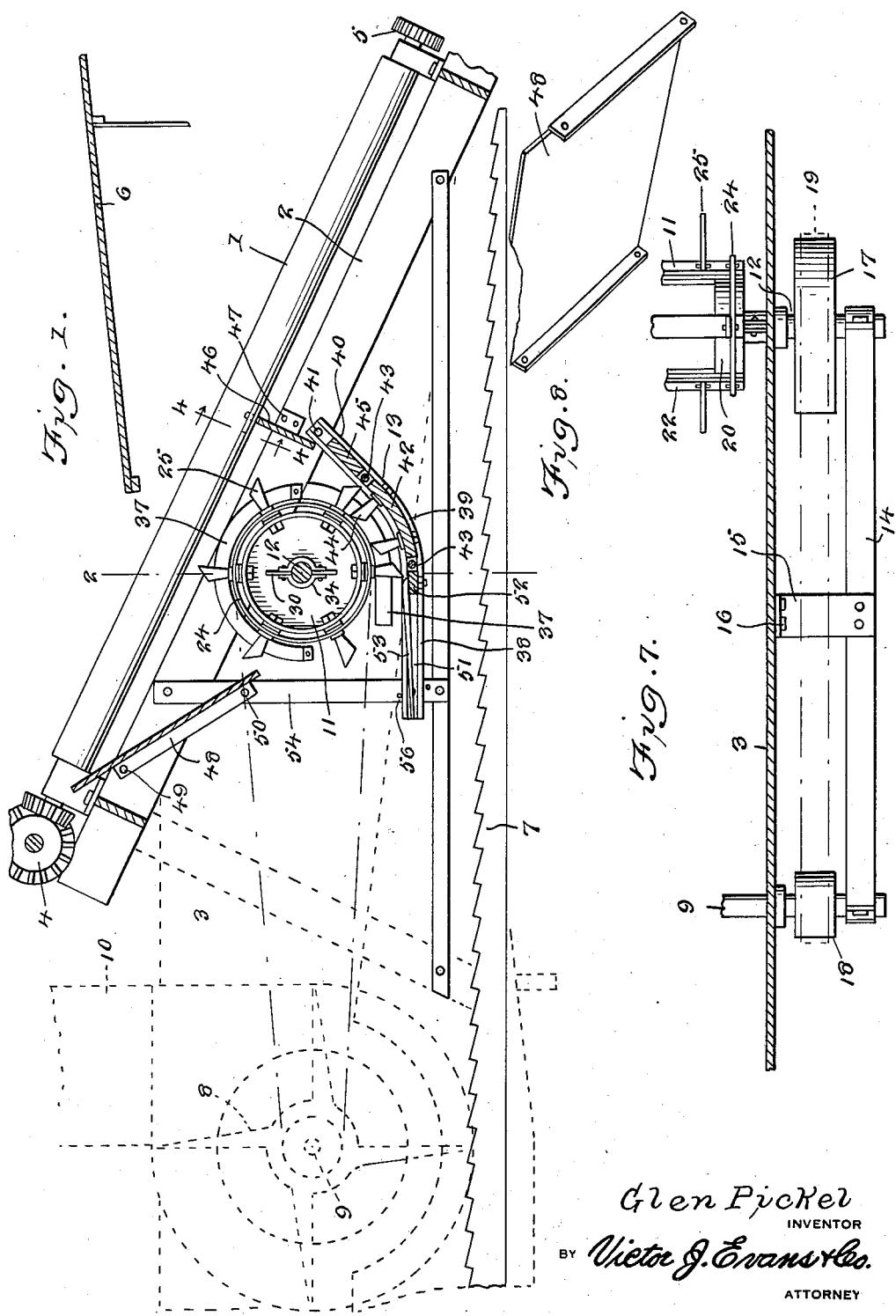
Glen Pickel
INVENTOR
BY Victor J. Evans & Co.
ATTORNEY Sept. 13, 1938.　　　　　G. PICKEL　　　　　2,130,312
CORN SHREDDING MECHANISM
Filed July 1, 1936　　　2 Sheets-Sheet 2
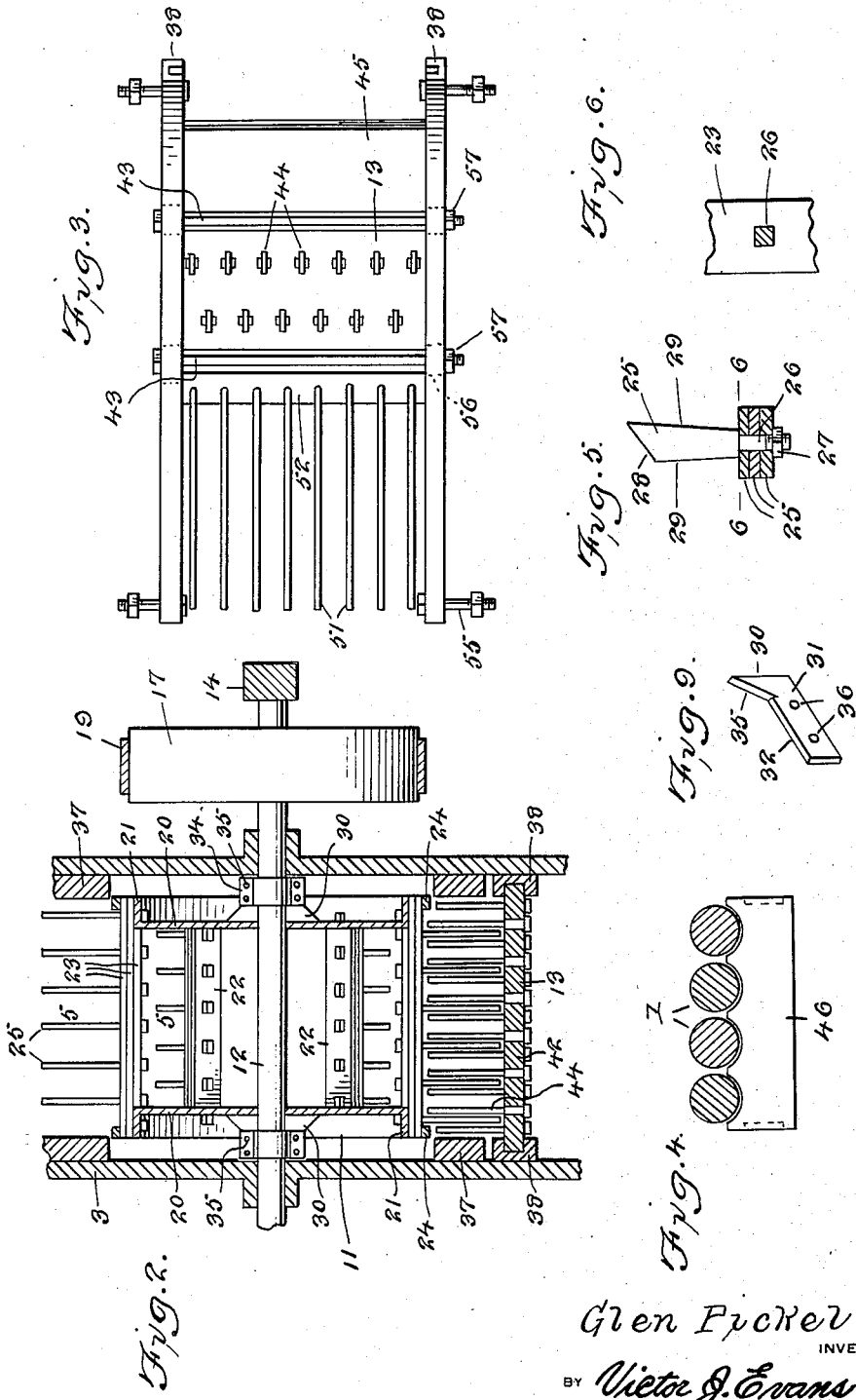
Glen Pickel
INVENTOR
BY Victor J. Evans & Co.
ATTORNEY Patented Sept. 13, 1938

2,130,312

UNITED STATES PATENT OFFICE 2,130,312

CORN SHREDDING MECHANISM

Glen Pickel, Reedsburg, Wis.

Application July 1, 1936, Serial No. 88,469

1 Claim. (Cl. 146—117)

My invention relates to corn husking and shredding machines and more particularly to improvements in shredding mechanism for such machines.

Machines of the class above designated usually embody a set of husking rollers or brushes feeding corn stalks and husks to a toothed shredding roller, a blower discharge for the shredded stalks and husks, and a vibratory sieve below the shredding roller for feeding the shredded stalks to the blower and shelled corn, which will have dropped through the husking rollers, out of the machine. An objection to such machines, as usually constructed, is that the shredded stalk or fodder is too coarse for general use, for instance as fertilizer, and bedding, as well as feed, and because of its coarseness frequently clogs the blower. Also the shredding roller of present machines permits small nubbins, or ears, of corn to pass unshelled into the sieve to be blown out of the blower with the fodder. This results in a considerable waste of corn.

With the foregoing in mind, the principal object of my invention is to provide a shredding mechanism for incorporation in such machine which is operative to cut the corn stalks and husks into finer shreds of shorter length than present day machines, so that it is well adapted for general use and will not clog the blower.

Another object is to provide a shredding mechanism for the purpose above set forth which is adjustable to effect coarse or fine shredding, as desired, and particularly designed for incorporation in standard makes of husking and shredding machines without necessitating extensive alterations of the latter.

Still another object is to provide a mechanism of the character and for the purposes above set forth which will function to shell stray nubbins of corn the size of a cornstalk that have gone through the husking rollers with the corn fodder and to break up the cobs so that the shelled corn will pass through the sieve and the cobs out of the blower.

To the accomplishment of the above, and subordinate objects presently appearing, a preferred embodiment of my invention has been illustrated in the accompanying drawings, set forth in the following description, and defined in the claim appended hereto.

In said drawings:

Figure 1 is a view in longitudinal vertical section illustrating my improved shredding mechanism incorporated in a machine of the type previously identified.

Figure 2 is a view in transverse vertical section taken on the line 2—2 of Figure 1 and drawn to an enlarged scale.

Figure 3 is a view in top plan of a concave comprehended by my invention.

Figure 4 is a view in transverse section taken on the line 4—4 of Figure 1 looking in the direction indicated by the arrows.

Figure 5 is a view in transverse section of one of a plurality of toothed units of the shredding mechanism.

Figure 6 is a view in horizontal section taken on the line 6—6 of Figure 5 looking downwardly.

Figure 7 is a view partly in horizontal section and partly in top plan of an extra or additional bearing for the shaft of the shredding cylinder and the shaft of the blower.

Figure 8 is a view in perspective of a baffle plate and

Figure 9 is a view in perspective of a cutter blade associated with the shredding cylinder.

Reference being had to the drawings by numerals, the type of machine with which my invention is particularly concerned, comprises the usual husking rollers or brushes 1 rotatably mounted, in an oblique position, on a frame 2 between the side walls 3 of the machine and extending longitudinally thereof. The rollers 1 are driven by gearings 4 and 5 in a manner which will be understood and need not be described in detail herein. The corn is fed from a feed platform 6 to the rollers 1, the ears gravitating down the rollers to a conveyor, not shown, and the stalks and husks passing through the rollers 1 to the shredding mechanism of the machine. Below the rollers 1 is a vibratory sieve 7 feeding the shredded husks and stalks to a blower fan 8 fast on a fan shaft 9 which discharges the shredded stalks and husks upwardly through a discharge pipe 10. The shelled corn escaping between the rollers 1 is fed by the sieve 7 to a discharge spout, not shown.

My improved shredding mechanism comprises a shredding cylinder 11 fast on a shaft 12 journaled transversely of the rollers 1 in the side walls 3 of the machine between said rollers and the sleeve 7, and a concave 13 mounted, as presently described in detail, between the cylinder 11 and the sieve 7. The cylinder 11 and the fan 8 are driven in opposite directions, by the usual belt drive which, since it forms, per se, no part of the present invention, has not been illustrated in the drawings.

One end of the shaft 12 extends beyond one side wall 3 and is journaled in one end of a bearing bracket 14 spaced outwardly of said side wall and bolted to the same by an arm 15 thereon and bolts 16 extending through said arm. The other end of the bracket 14 serves as a journal bearing for the fan shaft 9, which is likewise extended through the side wall 3 in the same manner as the shaft 12. The shafts 12 and 9 are connected together in driving and driven relation by means of a pair of pulleys 17 and 18 fast on said shafts, respectively, intermediate the side wall 3 and the bearing bracket 14, and a belt 19 extending between the said pulleys. The described mounting for the shafts 12 and 9 and the connection therebetween provides an extra bearing for reducing vibration, particularly of the cylinder shaft 12 and the cylinder 11, and reduces wear on the remaining bearings of said cylinder shaft.

The cylinder 11 comprises cylinder heads 20 having out-turned edge flanges 21, respectively, and fixed in any suitable manner to the shaft 12 with the heads 20 spaced inwardly of the side walls 3, for a purpose presently seen. The cylinder heads 20 are connected together by a plurality of toothed cross bar units 22 spaced equidistantly around said heads parallel with the axis thereof. Each unit 22 comprises three superposed flat bars 23, the inner bar being shorter than the outer ones and fitting between the heads 20 to act as a spacer element and the other bars being of the same length and having their ends overlying the flanges 21 of said heads 20. A pair of retaining rings 24 surrounding the overlying ends of the bars 23 at opposite ends of the cylinder 11 and welded to said ends, secure the units to said heads. The teeth 25 of the units 22 are spaced along the same equidistantly to provide series of radially disposed teeth extending around said cylinder with the teeth of each series in a common plane. The teeth 25, as shown in Figure 5, are secured to the bars 23 by means of reduced squared shanks 26 extending through said bars and nuts 27 threaded on the said shanks. Preferably, the teeth 25 are flat and provided with oblique outer ends 28 and side edges 29 converging inwardly of the cylinder 11.

A pair of knives 30 is mounted on the shaft 12 in the space between the heads 20 and the walls 3 at each end of the cylinder 11 to cut twine, and the like, which may have passed into such spaces, and thereby prevent the same from winding around the shaft 12. The knives 30 of each pair comprise a flat blade part 31 having a straight outer cutting edge 32 and an oblique cutting edge 33 extending upwardly from one end thereof. The knives 30 are clamped to the shaft 12 in diametrically opposite relation, in each pair, with their oblique cutting edges inclining from the heads 20 and by means of pairs of clips 34 and bolts 35 passing through said clips and apertures 36 in said blades.

Adjacent each end of the cylinder 11 are curved fender bars 37 suitably secured to the side walls 3 to partially surround the outer ends of the cylinder 11 and prevent the stalks or the husks from passing into the spaces between the cylinder heads 20 and the side walls 3.

The concave 13 comprises a pair of opposed longitudinally channeled supporting bars 38 having intermediate arcuate portions 39 concentric to the cylinder 11 and straight end portions 40. The bars 38 are pivotally suspended at one end, as at 41, to the frame 2 to underlie opposite ends of the cylinder 11. A toothed panel 42, transversely curved concentrically of said cylinder, is slidably mounted at its opposite ends in said channeled supporting bars 38 and retained in the arcuate portions of said bars by means of a pair of cross rods 43 extending through said bars along opposite sides of said panel 42, respectively. The panel 42 has mounted therein two longitudinally extending rows of teeth 44 secured in said panel, to extend radially of the cylinder 11, in the same manner as described with reference to the teeth 25. The teeth 44 are staggered in one row relative to those in the other row to form pairs of closely spaced teeth between which the teeth 25 of the cylinder 11 pass. A feed panel 45 is slidably mounted at its opposite ends in the channel of the bars 38 on the same side of the panel 42 as the pivots 41 of said bars. A baffle plate 46, extending transversely of the frame 2 and secured thereto by brackets 47, forms, in conjunction with the feed panel 45, a chute at one side of the cylinder 11 for the passage of the stalks and husks from the rollers 1 between the cylinder 11 and the concave 13. On the opposite side of the cylinder 11, a transversely extending baffle plate 48 is secured to the frame 2 as by a pivot rod 49 and bolts 50 to incline downwardly and toward the cylinder 11 to direct the stalks and fodder from the rollers 1 to the cylinder 11 on said side of the cylinder. On the side of the panel 42, opposite to the panel 45, is a fodder sifting frame 51 comprising a transversely disposed bar 52 slidably mounted at its opposite ends in the channeled bars 38 and a plurality of tines 53 extending therefrom over the sieve 7. The ends of the bars 38 opposite to their pivoted ends are adjustably mounted on a pair of uprights 54 by means of bolts 55 adapted to be inserted in vertically spaced bolt holes 56 provided in said uprights. The bars 38 are slotted, as at 56, for the passage of the ends of the rods 43 therethrough and for adjustment of said rods longitudinally of said bars. Nuts 57 on the rods 43 provide for clamping the described parts of the concave in fixed relation. By inserting the bolts 55 in different bolt holes 56, the concave 13 may be adjusted vertically to adjust the teeth 44 lengthwise of the teeth 25, substantially radially of the cylinder 11.

By loosening the nuts 57, the panel 42 and the rods 43 may be slid along the bars 38 to vary the position of the teeth 44 thereon transversely of the cylinder 11 and of the teeth 25 of said cylinder. Obviously the panel 45 and the sifter frame 51 may in the same manner be adjusted in correspondence with the position of the panel 42. The nuts 57 may then be tightened to clamp the parts in adjusted relation between the bars 38. The proper adjustments of these parts in the directions indicated, provide for varying the cooperative relation of the teeth 25 and 44 for fine and coarse shredding, as will be clear.

By having the teeth 25 and 44 arranged so that the former pass through a closely spaced pair of the latter, nubbins of corn escaping into the shredding mechanism are broken up and shelled.

A particular advantage of the arrangement of parts described is that it obviates frequent sharpening, tampering and hardening of the cylinder and concave teeth. In actual practice it has been found that such sharpening, tempering etc. once a season is amply sufficient.

The foregoing description of the preferred embodiment of my invention will, it is believed, suffice to impart a clear and understanding of my invention, without further explanation.

It is to be understood, however, that the details described are illustrative rather than restrictive and that right is herein reserved to modifications of such details falling within the scope of the claim appended hereto.

What I claim is:

In a shredding mechanism, a rotatably mounted shaft, a toothed shredding cylinder comprising cylinder heads fast on said shaft and a pair of knives secured to said shaft adjacent to the outer sides of each of said heads in diametrically opposed relation, the knives of each pair comprising a straight outer cutting edge parallel with said shaft and an oblique cutting edge inclining outwardly from the straight edge toward the related head.

GLEN PICKEL.